INVENTOR:
DAVID W. WAGNER

BY Raymond P. Wallace

AGENT

United States Patent Office 3,564,847
Patented Feb. 23, 1971

3,564,847
COMBUSTION DEVICE FOR GAS
TURBINE ENGINES
David W. Wagner, Wayne, N.J., assignor to Curtiss-
Wright Corporation, a corporation of Delaware
Filed Oct. 11, 1968, Ser. No. 766,724
Int. Cl. F02c 3/24
U.S. Cl. 60—39.71                                    5 Claims

ABSTRACT OF THE DISCLOSURE

The combination of an atomizing spray nozzle discharging into a vaporizing device positioned in the combustion chamber of a gas turbine engine enhances vaporization of the fuel, improves cooling of the vaporizer, and prevents vapor lock in the fuel feed tube.

BACKGROUND OF THE INVENTION

This invention relates to fuel burner structure for gas turbine engines, and more particularly to the means of introducing the fuel into the combustion chamber. Atomizer nozzles for spraying fuel into a combustion chamber are known, whereby the liquid fuel is sprayed into the combustion zone in a mist of fine droplets which are then mixed with air for burning. Such a method of fuel introduction may result in inefficient and incomplete burning, or else requires a very long combustion chamber for complete mixing with air and combustion.

There is also known a vaporizing type of fuel nozzle, such as that shown in U.S. Pat. No. 3,267,676. This is a tube positioned in the combustion chamber parallel to the axis thereof and re-entrant into a cap or baffle of larger diameter at the downstream end of the tube. A fuel pipe enters the upstream end of the tube and squirts a jet of fuel thereinto at high throttle, or dribbles fuel thereinto at low throttle, which fuel then vaporizes inside the hot tube which is in the flame zone, the vapor then being discharged and directed in the upstream direction by the cap, for mixture with air and combustion. Another type of vaporizing nozzle is the conventional J-tube, in which the vaporizer tube is recurved and discharges vapor in the upstream direction within the combustion chamber.

Such vaporizing nozzles also have difficulties. The tube of the vaporizing nozzle, being directly within the flame zone of the combustion chamber, is supposed to be cooled by the fuel being discharged in its interior. When the engine is throttled back, the fuel is merely dripping from the feed pipe onto a spot within the tube, and the tube may burn out at an uncooled location. When the throttle is high, the fuel jet may impinge only upon the recurved portion of the tube or the baffle, leaving the straight portion uncooled. This may not only cause burning, but also induces excessive thermal stresses between the cooled and uncooled portions. Further, the fuel pipe supplying such a vaporizer nozzle is very close to the hot zone, and particularly at low throttle the fuel may boil in the feed pipe, back-pressuring it so that no fuel is delivered, resulting in poor engine operation and possible burning of the vaporizer tube.

SUMMARY

This invention provides a fuel nozzle having a combination of elements of both the atomizing and the vaporizing systems. A duplex atomizer nozzle discharges fuel into a vaporizer tube, with provision for washing the interior of the wall of the vaporizer tube with fuel at both high and low throttle, thus maintaining the tube cool and reducing thermal stresses, and at the same time providing improved vaporization and efficient combustion.

It is therefore an object of the invention to provide an improved fuel burner structure for turbine engines.

It is another object to provide a vaporizer nozzle with improved cooling thereof.

It is a further object to provide a combination atomizer-vaporizer fuel nozzle for jet engines.

Other objects and advantages will become apparent on reading the following specification in connection with the appended drawings.

DESCRIPTION OF THE PREFERRED
EMBODIMENTS

Figure 1:
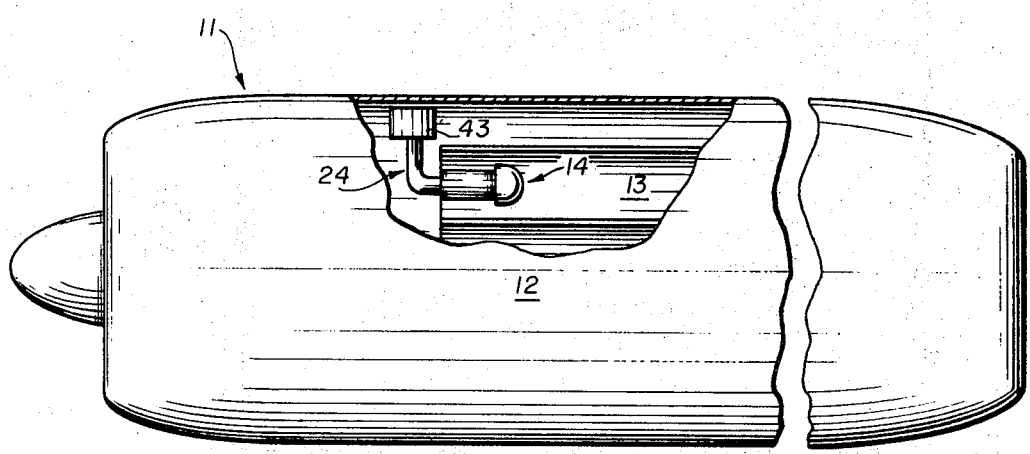
FIG. 1 is an external view of an aircraft turbine engine, partially broken away to show the positioning of the improved fuel nozzle.

In FIG. 1 there is shown semischematically an external view of an aircraft turbine engine 11 having a casing 12 partially cut away to show a combustion chamber 13 and the positioning of the fuel nozzle 14 therein.

Figure 2:
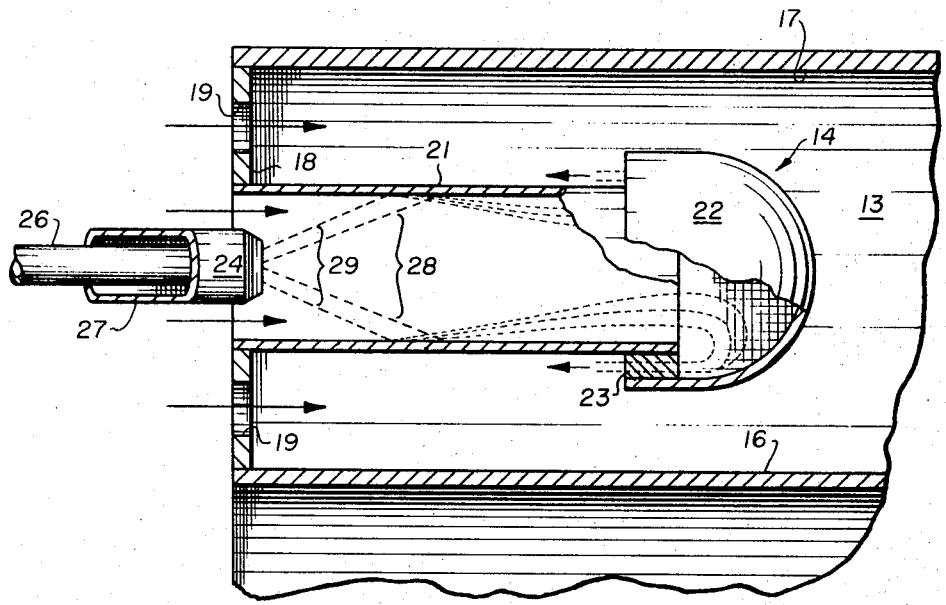
FIG. 2 is an enlarged cross-sectional elevation of one embodiment of the improved nozzle.

In FIG. 2 there is shown a combustion chamber 13, having walls 16 and 17 and a headplate 18 disposed at the upstream end, the headplate being apertured at 19 for entrance of air from the compressor, as shown by the arrows. A vaporizer tube 21 extends from the headplate in a downstream direction, and has a mushroom cap 22 positioned over the downstream end of tube 21, concentric therewith and occluding the open downstream end of the tube. The cap 22 is supported on tube 21 by members 23 as shown here, although other means of support may be utilized. Since the cap is of larger diameter than the tube and has its open end facing the upstream end of the combustion chamber 13, fuel vapor generated in the vaporizing tube 21 will be discharged therefrom in the upstream direction, through the annular clearance between the tube and the cap, as shown by the dashed arrows.

The upstream end of vaporizer tube 21 is open and receives air from the compressor. An atomizing fuel nozzle 24 is positioned so that a fuel spray enters the upstream open end of the vaporizer tube approximately concentrically therewith. In some cases the nozzle may enter the tube, but the length of the nozzle 24 actually entering the vaporizer tube is very short, just sufficient that the atomized spray discharged therefrom will be received wholly within the vaporizer tube, in order to utilize as much as possible of the length of tube 21 for vaporization.

The atomizer nozzle 24 shown is a duplex nozzle, having an inner fuel feed tube 26 for discharge of a small spray at low throttle conditions, and an external surrounding jacket tube 27 carrying an augmented fuel flow at higher throttle conditions. It will be understood, however, that a simplex nozzle may also be used in combination with a vaporizer in certain turbines, having only a single fuel feed tube and discharging more or less fuel according to pressure. The spray cone of atomized fuel from the inner fuel feed tube 26 is indicated by the dashed lines 28, and the larger spray cone from fuel feed tube 27 by dashed lines 29.

The spray cones 28 and 29 of atomized fuel impinge on the inner wall surface of vaporizer tube 21, which by reason of being in the flame zone of the combustion chamber 13 is at a high temperature. The spray of atomized liquid fuel serves to cool tube 21 and keep its temperature below the point at which it might burn. The wall of tube 21 is hot enough, however, to vaporize the fuel spray, and the resulting vapor is carried downstream by the air current entering the upstream end of tube 21. The fuel vapor, still relatively cool, strikes the inner surface of mushroom cap 22, keeping it from burning and is then deflected out through the annular space between the cap and the vaporizer tube, discharging in the upstream direction into the combustion chamber where it mixes with air entering through apertures 19 in the headplate for complete combustion.

Figure 3:
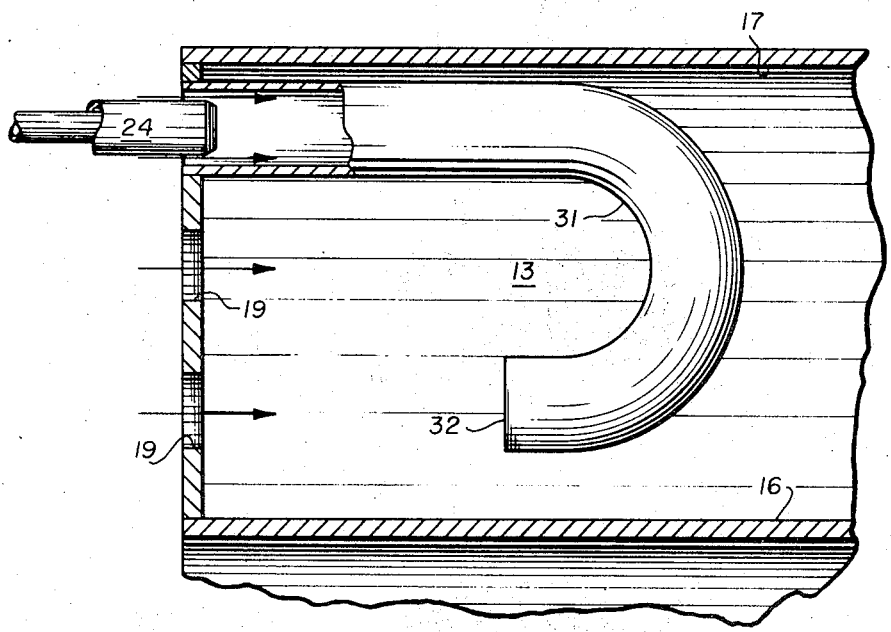
FIG. 3 is a similar view of another embodiment.

FIG. 3 shows another embodiment of vaporizing nozzle, having a J-tube 31 instead of a mushroom tube. In the J-tube the vaporizing tube has its downstream end recurved into the upstream direction with the orifice 32 open for discharge of vaporized fuel. In other respects its operation is similar to that of the mushroom tube vaporizer.

Figure 4:
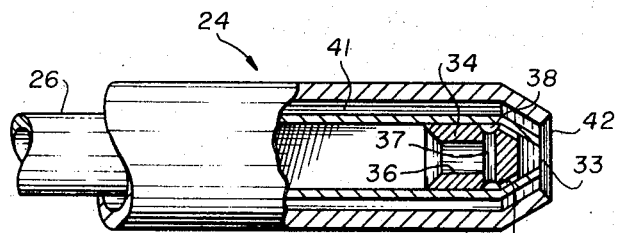
FIG. 4 is a fragmentary view of one embodiment of the atomizer portion.

One form of duplex atomizer nozzle 24 is shown in FIG. 4. There is provided an inner fuel feed tube 26 for small fuel flow. The delivery end of tube 26 is swaged or otherwise contracted to a conical form to provide an orifice 33. Inside the delivery end is positioned a plug member 34, having at its upstream end a cavity 36 of restricted diameter for entrance of the fuel. Cavity 36 communicates by generally radial passages 37 with an annular groove 38 on the outer surface of the plug, which defines a passageway with the enclosing wall of tube 26. The conical surface of the downstream end of plug 34 is provided with grooves 39 defining with the constricted end of tube 26 passages communicating with the annular header passage 38. Passages 39 are not parallel with the conical surface of plug 34, but are angularly oriented thereon, so that a swirling component of motion is given to liquid fuel passing through the passages. Such a swirling motion of the fuel results in a conical spray discharge of atomized fuel through orifice 33.

The jacket tube 27 surrounding inner tube 26 defines an annular fuel passage 41 therewith, and also has its downstream end conically swaged to provide a larger orifice 42. The annular passage 41 has a much larger capacity than that of the inner tube, and is capable of delivering a much greater volume of fuel. The discharge end of jacket tube 27 may also be provided with swirl passages if desired. Appropriate valving arrangements are indicated at 43 (shown in FIG. 1) for controlling the flow through inner fuel tube 26 and outer tube 27. The duplex atomizer nozzle of FIG. 4 described above is conventional.

Figure 5:
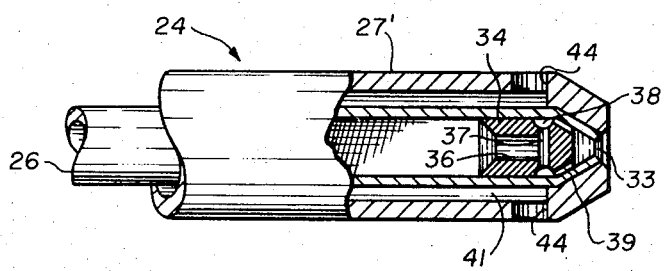
FIG. 5 is a similar view of another embodiment of the atomizer portion.

FIG. 5 shows a modified embodiment of duplex atomizer nozzles. The swirl discharge arrangement of inner tube 26 is the same as in FIG. 4. However, the jacket tube 27' does not have an orifice at its downstream end, but has that end closed and in sealing contact with the conical end of the internal tube 26. Just upstream from the conical portion of inner tube 26, jacket tube 27' is provided with a plurality of apertures 44 through the tube wall and communicating with jacket passage 41. Apertures 44 may be radial, or tangential to provide a swirling discharge. In either case, there is not formed a conical spray cone such as the discharge 29 from orifice 42 of the previous embodiment, but a radial or tangential discharge which impinges directly upon the inner wall of the vaporizer, which may be either the mushroom type or the J-tube previously described.

With the foregoing arrangement of an atomizer nozzle feeding a vaporizer, the cooling of the vaporizer tube is much improved even at low throttle values, since there is always a spray of fuel inside the vaporizer tube. Uncooled spots are eliminated, and thermal stresses are reduced. The double feed pipe of the atomizer is not subject to boiling, since there is always fuel under pressure in the internal tube, the pressure drop taking place only at the spray orifice. The external tube also shields the inner tube from the heat. Boiling does not occur in the jacket tube of the atomizer because at high throttle conditions the flow of fuel therethrough is great enough to prevent it.

Although the invention has been described above in preferred embodiments, it will be understood by those skilled in the art that various modifications may be made without departing from the scope of the invention. It is intended to cover all such modifications by the appended claims.

What is claimed is:

1. Combustion chamber structure comprising in combination:
  (a) a casing forming a combustion chamber, the casing having a wall across its upstream end;
  (b) at least one fuel-vaporizing tube extending from the wall in a downstream direction into the flame zone of the combustion chamber;
  (c) the fuel-vaporizing tube being open at its upstream end for fuel spray and air flow thereinto and having means at its downstream end for discharging air and fuel vapor in an upstream direction;
  (d) an atomizing spray nozzle positioned to discharge a spray of atomized liquid fuel into the vaporizing tube approximately concentrically therewith and against the inner wall thereof;
  (e) the atomizing spray nozzle having an outer jacket tube and an internal tube generally coaxial therewith, the internal tube discharging a small generally conical spray in a downstream direction at low throttle conditions and the jacket tube discharging a larger spray at higher throttle conditions.

2. Combustion chamber structure comprising in combination:
  (a) a casing forming a combustion chamber, the casing having a wall across its upstream end;
  (b) at least one fuel-vaporizing tube extending from the wall in a downstream direction into the flame zone of the combustion chamber;
  (c) the fuel-vaporizing tube being a straight member open at its upstream end for fuel spray and air flow thereinto and having a cap member supported across and spaced from its downstream end, the cap member being of larger diameter than the tube and defining therewith an annular orifice therebetween for directing air and fuel vapor discharging from the downstream end of the tube into an upstream direction externally of the tube;
  (d) an atomizing spray nozzle positioned to discharge a spray of atomized liquid fuel into the vaporizing tube approximately concentrically therewith and against the inner wall thereof;
  (e) the atomizing tube having an outer jacket tube and an internal tube generally coaxial therewith, the flow area of the jacket tube being of greater capacity than the flow area of the internal tube, the internal tube discharging a small generally conical spray into the vaporizing tube at low throttle conditions, and the jacket tube discharging a larger spray into the vaporizing tube at higher throttle conditions.

3. The combination recited in claim 1, wherein the larger spray from the jacket tube is generally conical and surrounds the smaller conical spray.

4. The combination recited in claim 1, wherein the larger spray from the jacket tube discharges upstream from the smaller spray and in a generally radial direction.

5. The combination recited in claim 2, wherein the larger spray from the jacket tube is generally conical and surrounds the smaller conical spray, and the orifices of both the jacket tube and the internal tube are reduced to smaller cross-sectional areas than the cross-sections of the respective flow areas of the tubes to provide a pressure drop at the orifices.

References Cited

UNITED STATES PATENTS

| 2,583,416 | 1/1952 | Clarke | 60—39.71 |
| 2,720,753 | 10/1955 | Sharpe | 60—39.71 |
| 3,267,676 | 8/1966 | Sneeden | 60—39.74 |
| 3,407,596 | 10/1968 | Dasbach | 60—39.71 |
| 3,430,443 | 3/1969 | Richardson | 60—39.71 |

DOUGLAS HART, Primary Examiner

U.S. Cl. X.R.

60—39.74